Aug. 6, 1929. R. A. BENNETT 1,723,006
ORE ROASTING RETORT FURNACE
Filed March 5, 1928 2 Sheets-Sheet 2
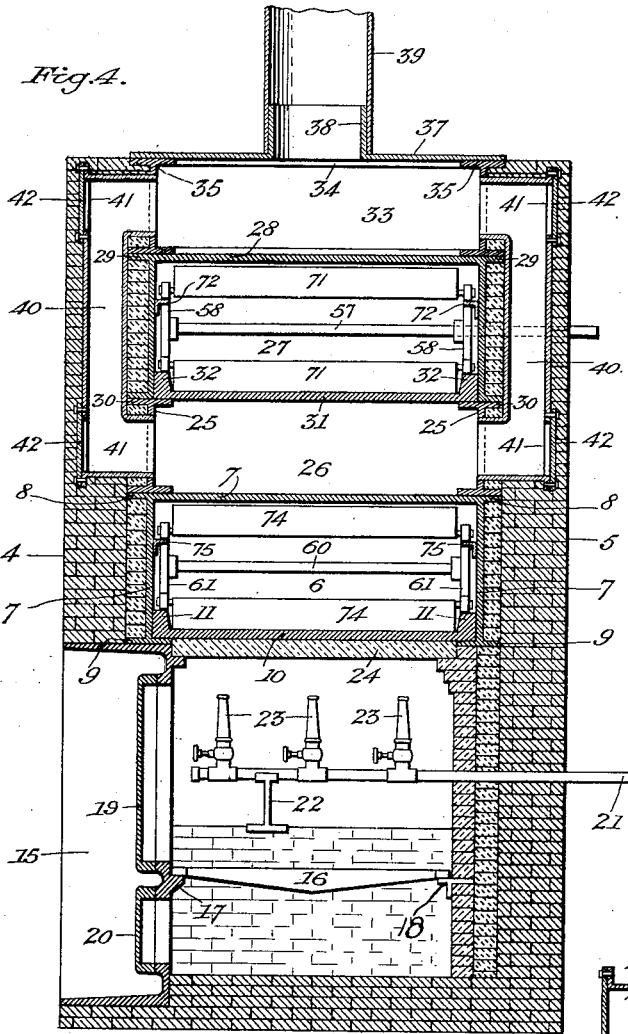
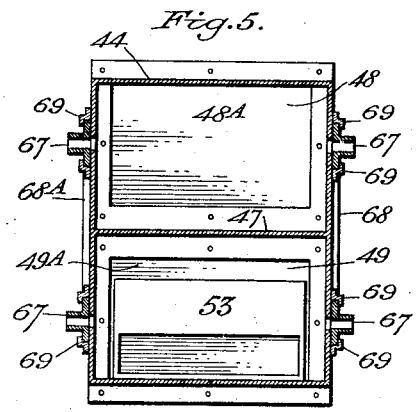
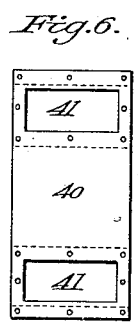
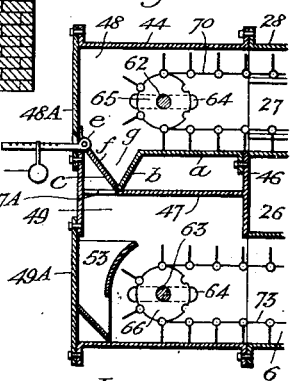
Inventor
Ray A. Bennett.
By H. S. Bailey, Attorney.

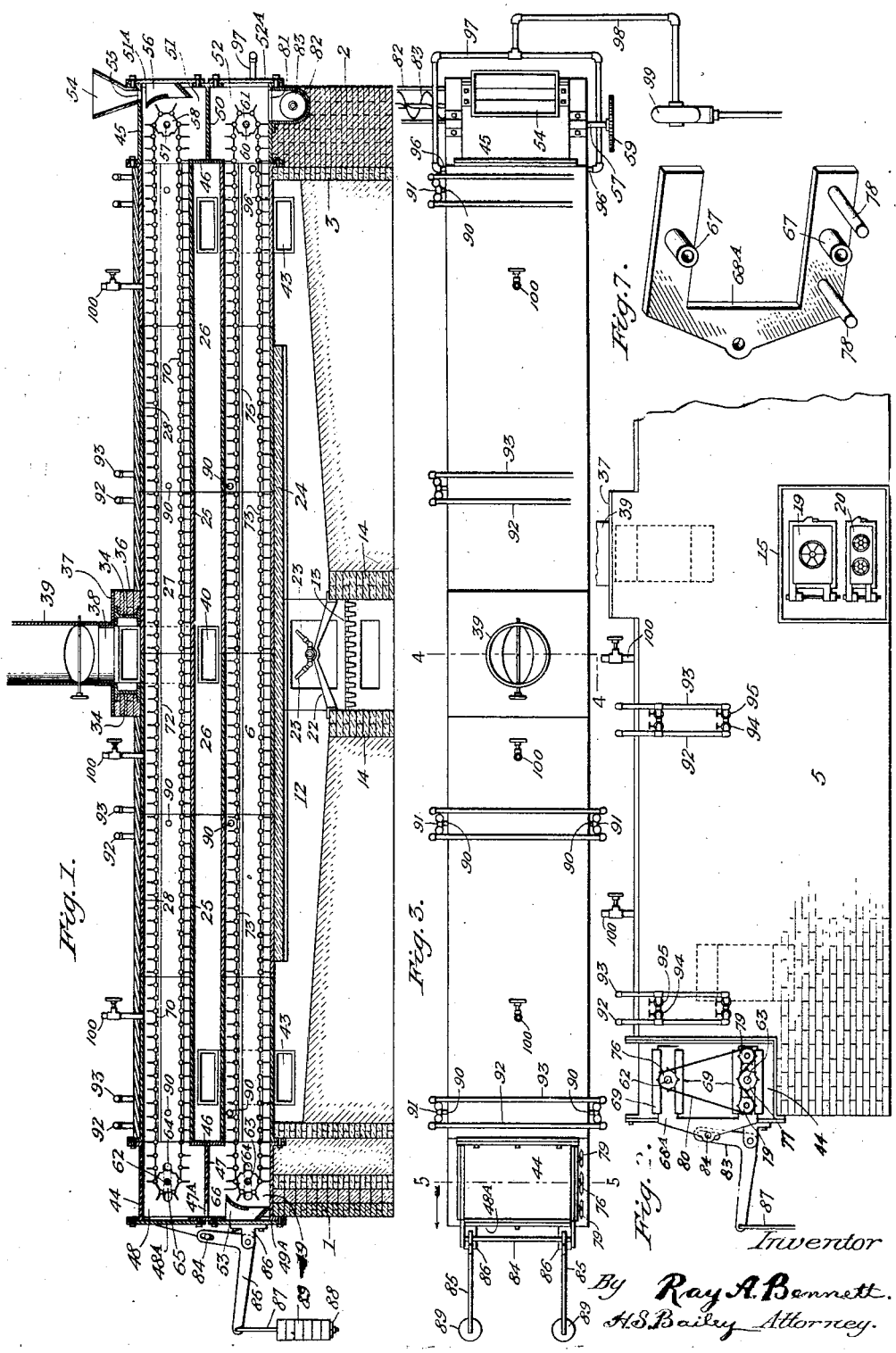

Patented Aug. 6, 1929.

1,723,006

UNITED STATES PATENT OFFICE.

RAY A. BENNETT, OF DENVER, COLORADO.

ORE-ROASTING RETORT FURNACE.

Application filed March 5, 1928. Serial No. 259,195.

My invention relates to improvements in ore roasting retort furnaces.

And the objects of my invention are:—

First, to provide an ore roasting furnace that is especially adapted to chemically change sulphide, gold, silver, lead, zinc and copper ores, and also the gold telluride and tellurium ores, such as sylvanite, petzite, calaverite and hessite tellurium ores; also silver glance and other silver ores, and also the ores of platinum, uranium and other precious metals, to such soluble sulphates as will readily dissolve in solutions from which their values may be recovered by amalgamation and by cyanide and suitable precipitants, and also by mechanical, chemical and electrical treatments.

Second, to provide an ore roasting retort furnace into which finely crushed and granulated and pulverized ores are fed after they are perfectly dry, in which condition there is a large percentage of dust that is fine enough to float in the retorts, and which carries values in gold and silver and other metals and which product is partially lost in some of the furnaces in use, owing to their construction, which permits this floating ore to flow out of the furnace through their discharging outlet which is placed in furnaces having two ore roasting floors, one directly above the other at the same end of the furnace as the ore feeding inlet and this floating ore is drawn down through the adjacent end space that is close to the ore inlet, and out of the furnace through its roasted ore discharging outlet which is at the bottom of the end space below the ore inlet, and an essential object of my invention is to provide an ore roasting retort furnace in which the upper retort is separated from the lower retort by integral and solid and imperforated floor and end wall members so that it is impossible for the dust to flow down to the discharge outlet of the furnace without passing through it, but it must settle down on to the floor of the upper retort and be fed through it by my ore moving and rabbling mechanism.

Third, to provide an ore roasting retort furnace in which the heat is applied to the center of the length of the furnace under the lower retort and is directed to flow in opposite directions to the opposite ends of the furnace, into and through valve controlled by-pass flues that extend from the heating flue below the lower retort around it into the opposite ends of a flue that is formed between the lower and upper retorts in the center of the length of which an outlet flue is formed that conveys the smoke and heat around the upper retort into a chimney. This arrangement of the heating means and the valve controlled by by-pass flues, permitting me as another essential object of my invention to either apply even degrees of heat to the opposite ends of the retorts, thereby giving an even temperature, or to increase it at one end and thus diminish it at the other end as desired, causing a reaction necessary for some ores, to govern the application of the heat to different ores and oil shales to attain the quickest and most even and perfect roasting and retorting of them.

Fourth, to provide a simple, substantially and easily constructed ore roasting furnace, in which the upper and lower retorts are entirely separated from each other except the ore chute that extends down from the upper retort to the lower retort and in which the ore moving and rabbling mechanism of each retort is entirely separate from the other retort.

I attain these objects by the mechanism illustrated in the accompanying drawings in which:—

Figure 1 is a vertical longitudinal sectional view of the improved retort furnace.

Figure 2 is a side elevation of a portion of the furnace shown in Figure 1.

Figure 3 is a plan view of Figure 1.

Figure 4 is a vertical transverse sectional view—enlarged—on the line 4—4 of Figure 3.

Figure 5 is a vertical sectional view—enlarged—through the hood at the front end of the furnace, on the line 5—5 of Figure 3.

Figure 6 is a front view of one of the by-pass flues, the covers which normally close the openings permitting access to the interior of the flue, being removed.

Figure 7 is a perspective view of one of the slidable yokes which support the two conveyor shafts at the forward end of the machine.

Figure 8 is a vertical sectional view of the hood on the front end of the furnace, showing a hinged shutter for normally sealing the ore outlet in the horizontal partition of said hood.

Referring to the accompanying drawings. The numerals 1 and 2 indicate end foundation walls which are built up to the level of the lower retort. The front end wall 1 is preferably a double wall of suitable heat resisting brick, the intervening space being filled with earth, and the rear end wall 2, is preferably solid brick of the common type, with an inside facing 3 of heat resisting brick. The side walls 4 and 5 extend to the top of the upper retort, but terminate on a line with the inner brick facings of the end walls, so as to permit the end hoods, to be hereinafter described, to rest upon the said end walls, as clearly shown in Fig. 1. The side walls have inner facings of suitable heat resisting brick, the remains of the walls being of common brick.

The lower retort 6 is preferably made up of six inverted channel sections 7, having lateral flanges 8, along their upper side edges, the lower ends of their side members terminating in T-flanges 9, which rest upon the brick work of the side walls and thus support the retort sections. The two end sections also rest upon the respective end walls, as shown in Fig. 1. The bottom of the retort is made up of six plates 10, which rest upon the T-flanges 9 and are provided along their sides with right angled track members 11, which together form continuous parallel tracks throughout the length of the retort. The retort sections are each five feet long, so that the full length of the retort is thirty feet, but it may be longer or shorter, as may be found necessary. A flue space 12 is formed beneath the lower retort and extends the entire length of the same, being enclosed by the end and side walls of the furnace. A combustion chamber 13 is formed midway of the length of the flue 12, by two transverse fire walls 14, which are about half the height of the end walls 1 and 2, and this chamber is closed on one side by a door plate 15, which fits in the side wall and extends up to the bottom retort, as shown in Fig. 4. Grate bars 16 are supported at one end on a ledge 17 formed on the door plate, and at their opposite ends on a bracket 18 which is supported in the adjacent side wall. A door 19 opens to the combustion chamber above the grate bars and a door 20 opens to the ash pit, or space below the grate bars. Either coal or oil may be used for heating the retorts, and to this end, I have also shown an oil supply pipe 21 extending through the side wall and supported above the grate bars by a bracket 22 which rests on the fire walls 14, and the pipe 21 is provided with suitable oil burners 23. A fire clay slab 24 extends beneath the lower retort and to within a short distance of the opposite end walls, and this slab protects the bottom of the retort from the intense heat generated in the combustion chamber. Upon the lower retort are supported parallel I-beams 25, which form the sides of a flue 26, the bottom of which is formed by the top of the lower retort and the top thereof by the bottom of the upper retort, as clearly shown in Fig. 4. There are preferably three I-beams on each side, each beam being ten feet in length.

The upper retort 27 is supported on the I-beams 25, and this retort is made up of six inverted channel sections 28, having flanges 29 extending along their upper side edges, and flanges 30 extending along the lower edges of their side members, which rests upon the I-beams 25. This retort is provided with bottom plates 31, which also rest upon the I-beams 25, and the side edges of these plates terminate in right angled track members 32, which together form parallel tracks extending the entire length of the retort. A transverse flue 33 is formed upon the upper retort and centrally of its length, by side and end I-beams 34 and 35 respectively, which are inclosed in brick work 36. A crown plate 37 rests upon the I-beams 34 and 35, and is provided with a central neck 38 for the reception of a stack 39.

The flue 33 is connected at each end with the flue 26, by a by-pass flue 40, in the form of a hollow casting which comprises a relatively long vertical portion which terminates at each end in a short right angled bend, and these right angled portions are inserted in openings in the I-beams 25 and 35, as clearly shown in Fig. 4. The front of each by-pass flue is provided with openings 41 which register with the right angled end portions of the flue, and which are normally closed by cap plates or covers 42, which are bolted to the flues, as shown. The openings 41 permit access to the interior of the flue, should the same become clogged up; and, though the cap plates are normally covered by a course of brick work, it is a simple matter to remove the bricks in order to remove the cap plates. The flue 12 is connected at each end with the flue 26 by by-pass flues 43, which are in all respects identical with the by-pass flues 40, so that the flue 12 communicates with the flue 26, through the by-pass flues 43, and the flue 26 communicates with the stack flue 33, through the flues 40, as will hereinafter be referred to.

Upon the end walls 1 and 2 are supported hoods 44 and 45 respectively, which are bolted to the flanged ends of the retorts 6 and 27, and are formed with vertical plates 46, which cover the ends of the flue 26. The hood 44 is divided centrally by a horizontal partition 47 into upper and lower chambers 48 and 49, and the hood 45 is divided centrally by a horizontal partition 50 into upper and lower chambers 51 and 52. The chambers 48 and 51 open into the upper retort 27, and the chambers 49 and 52 open into the lower retort 6. The outer ends of the chambers 48 and 49, of the hood 44, are normally closed by covers 48A and 49A, which are bolted to the hood, as shown in Figures 1 and 5, and the outer ends of the chambers 51 and 52 of the hood 45 are normally closed by covers 51A and 52A which are bolted to the hood. The partition 47 of the hood 44 has a transverse slot or opening 47A adjoining the front end of the hood, and below this seat is a hopper 53 which is secured to the cover 49A of the chamber 49. The hopper has an inclined lower end which faces an outlet opening in its inner side, whereby, material falling into the hopper is discharged laterally therefrom upon the bottom of the lower retort 6, as will later appear. A suitable receiving hopper 54 is secured to the top of the hood 45 over an opening 55 therein, and this hopper discharges into a hopper 56 which is secured to the cover 51A of the chamber 51, and the hopper 56 is identical in construction with the hopper 53, the covers 49A and 51A being interchangeable. A shaft 57 is mounted in bearings on the opposite sides of the chamber 51 of the hood 45 and have rigidly secured thereon, sprocket wheels 58, and one end of this shaft carries a gear wheel 59, which is adapted to be driven by suitable gearing, not shown. A shaft 60 is also mounted in bearings in the opposite sides of the chamber 52, and has secured thereon sprocket wheels 61. Shafts 62 and 63 extend through horizontal slots 64 in the opposite sides of the chambers 48 and 49 respectively of the hood 44, and are each provided with pairs of sprocket wheels 65 and 66 respectively. The ends of the shafts 62 and 63 are mounted in hubs 67, which are formed on the arms of yokes 68, and 68A, the said arms being mounted in slideways 69 on the opposite sides of the hood 44, as clearly shown in Figures 2 and 5. Upon the pairs of sprocket wheels 58 and 65 are mounted parallel chains 70, of any suitable type, which are connected by transverse scraper blades or rabblers 71. These chains and rabblers comprise an endless conveyor extending throughout the upper retort 27. The upper laps of the chains are supported on tracks 72, which are formed upon or secured to the opposite sides of the retort, and the lower laps of these chains are supported upon the tracks 32 which are formed upon the side edges of the bottom plates 31 of the said retort, and the tracks 32 are just high enough to permit the rabblers to engage the bottom of the retort as they travel through the same.

Upon the pairs of sprocket wheels 61 and 66, are mounted endless chains 73, which are connected by transverse scraper blades or rabblers 74, these chains and rabblers comprising an endless conveyor which extends throughout the lower retort 6 and is in all respects identical with the conveyor for the upper retort. The upper laps of the chains 73 are supported upon tracks 75 which are formed upon or secured to the opposite sides of the retort 6, and the lower laps of the said chains are supported upon the tracks 11 which are formed on the side edges of the bottom plates 10. One end of the shaft 62 has secured thereon, a sprocket wheel 76 and the corresponding end of the shaft 63 has secured thereon a sprocket wheel 77. This end of the shaft 63 passes through the hub 67 on the lower arm of the yoke 68A, and this arm is also provided with stub shafts 78, one on each side of the hub 67, and upon the stub shafts 78 are rotatably mounted sprocket wheels 79. A sprocket chain 80 is placed over the wheels 79 and over the wheel 77, so that when the upper conveyor is operated to move material from the receiving end of the retort 27 to the opposite end thereof, the sprocket chain 80 will operate the lower conveyor to move material in the opposite direction, or toward the discharge end of the lower retort 6, where it drops through an opening 81 in the bottom of the chamber 52 of the hood 45, and into a trough 82 supported in the end wall 2, and this trough is provided with a spiral conveyor 83, whereby the roasted material is continuously carried away from the furnace. The cross bars of the yokes 68 and 68A are connected by a rod 84, which also passes through slots in the ends of the upright members of a pair of bell crank levers 85, which are pivotally mounted in brackets 86 which are bolted to the door or cover 49A of the hood chamber 49. To the outer ends of the horizontally disposed arms of the bell crank levers are connected depending rods 87 having disks 88 secured upon their lower ends, which are adapted to support any required number of round, flat weights 89, which are stacked upon the rods 87. By the connection of the weighted bell crank levers with the slidable yokes 68 and 68A, the required tension on the endless conveyors is maintained, as will be understood. The horizontal partitions 47 and 50 of the hoods 44 and 45, are below the level of the floor of the retort 27, as shown in Figure 1, and this arrangement permits the ore which enters the retort through the hoppers 54 and 56 to form a bed on the partition 50, of a depth corresponding to the level of the floor of the retort, over which the scrapers travel and carry forward the infeeding ore. A similar bed is formed on the partition 47, and the body of ore on this partition assists in sealing the communication between the upper and lower retorts through the opening 47A in the partition 47. Any character of feed hopper may be employed, which will seal communication between the atmosphere and the interior of the retort 27.

By constructing the furnace as shown in Fig. 1, each retort is a complete unit, there being a complete seal between them, and therefore there is no chance of raw ore or shale being carried as dust from the feed hopper to the discharge, without being fully treated. By employing a sprocket wheel on the lower arm of the yoke 68A, which is either larger or smaller than the sprocket on the upper arm thereof, the conveyor in the lower retort can be made to travel at a different speed from the conveyor in the upper retort, whereby the material in the lower retort can be given a longer or shorter treatment than the material in the upper retort, if this may be found necessary. The retorts are provided on each side with inlet pipes 90, each of which connects with a branch 91, which in turn connects with a vertical air pipe 92 and a vertical steam pipe 93, the branch pipe 91 having valves 94 and 95, which admit either air or steam, as may be desired. The pipes 92 and 93 extend over the top of the furnace and on each side thereof, and are connected respectively with a compressed air supply and with a steam supply.

There are also gas discharge pipes 96 leading from each side of the lower retort rear the discharge end thereof, the purpose of these pipes being to carry off the heavy gases which collect at this end of the retort for future treatment. The pipes 96 connect with a pipe 97 which extends around the rear end of the furnace, and the pipe 97 is connected by a pipe 98 with a suction pump 99. The upper retort is also provided with valved pipes 100, which extend in through the top of the same, and these pipes are for the purpose of admitting oxygen when making a sulphate or oxidizing roast, or for taking off the gas when retorting shales, mercury ores, etc.

In operation, the furnace is heated to the required temperature, the heated air and smoke passing to each end of the flue 12 and out through the by-pass flues 43, to the flue 26, and thence through the by-pass flues 40 and flue 33 to the stack. Ore, which has previously been ground to the required degree of fineness, is then fed continuously into the feed hopper 54, whence it passes into and through the hopper 56 at the receiving end of the retort 27. The conveyor in this retort moves the ore continuously to the opposite end thereof, where it discharges through the opening 47A in the partition 47, and into the hopper 53 at the receiving end of the lower retort, which discharges it into the path of the lower conveyor, by which it is carried to the opposite end of the retort and discharged into the conveyor trough 82 for further treatment, such as by cyanide solution or by amalgamating plates, and concentrating tables, the amount of oxygen admitted to the retorts during the roasting process, being in proportion to the percentage of sulphur in the ore under treatment.

In Fig. 8 is shown a vertical section of the hood 44 having an attachment for effecting a positive seal between the upper and lower retorts at the discharge opening 47A in the partition 47. I accomplish this by means of a horizontal plate $a$ having a flange at one end which is bolted to the plate 46 which covers the end of the flue 26. This plate is on a level with the floor of the upper retort and its opposite end terminates in an inclined portion $b$ which extends down to the adjacent edge of the outlet 47A in the partition 47. An arm $d$ extends through the cover plate 48A and is hinged to the inner side of the plate, as shown at $e$, and to this arm is secured an inclined shutter $f$, which extends down to the lower end of the inclined member $b$, and forms therewith a V-shaped hopper $g$, which normally closes the outlet 47A. The arm $d$ is notched on its upper edge and a weight $h$ is hung thereon, and may be adjusted to permit the shutter $f$ to swing outward and open the outlet 47A under any predetermined pressure thereon from five to thirty five pounds. Thus, ore is moved into the hopper 9 by the conveyor 70, until the pressure of the ore against the shutter $f$ overbalances the weight $h$, when the shutter opens and permits the ore in the hopper $g$ to discharge into the hopper 53 of the lower retort, and the shutter instantly swings back and closes the outlet 47A.

Having described my invention, what I claim as new and desire to secure by Letters Patent, is:

1. In an ore roasting retort furnace; the combination of two retorts arranged one above the other with a heating flue between them; and a heating flue below them; of means including oil burners for heating said flues and said retorts, a smoke outlet flue in the center of the length of the flue between said retorts and a smoke stack connected to said flue; an ore feeding-in-inlet in the top of the upper retort; an ore outlet at the opposite end of the upper retort from its feeding-in-inlet, a chute in the lower retort below said outlet; and an ore discharging conveyor at the end of the lower retort below the ore feeding-in inlet of the upper retort; with an endless sprocket wheel chain conveyor, provided with operative ore rabbling blade mechanism in each retort independent of and in no way connected with the ore conveying and rabbling mechanism of the other retort; and with a floor member in the upper retort arranged to separate the floor of the upper retort from the floor of the lower retort, whereby the floating dust product of finely pulverized ores cannot flow directly downward to the discharge outlet of the floor of the lower retort, and flow out of it with the roasted ore, but must be moved through the two retorts and be roasted with all of the pulverized ore.

2. In an ore roasting furnace of the character described, the combination with horizontal retorts arranged one above the other and means for heating said retorts, the upper retort having a feed hopper at one end and an outlet at its opposite end communicating with the lower retort; of an endless conveyor in the upper retort for moving material from the receiving end to the opposite end thereof, an endless conveyor in the lower retort for moving material from the receiving end to the opposite end thereof and a discharge conveyor at the latter end, means common to both conveyors for maintaining them, under tension, and means for admitting air under pressure to said retorts.

3. In an ore roasting furnace of the character described, the combination with horizontal retorts arranged one above the other and means for heating them, said retorts having a communicating opening at one end, and a receiving hopper at the opposite end of the upper retort; of a shaft extending through horizontal slots in the sides of each retort at one end, slidable means on the sides of the retort having bearings to receive the ends of said shafts, a shaft mounted in the sides of each retort at their opposite ends, pairs of sprocket wheels on each of said shafts, an endless conveyor mounted on the sprocket wheels in each retort, means for exerting a pull on said slidable means, thereby to maintain said conveyors under tension, and means connecting the two movable shafts whereby one of them is turned in an opposite direction from the other.

4. In an ore roasting furnace of the character described, the combination with horizontal retorts, arranged one above the other, shafts in the ends of each retort, and independent endless conveyors mounted on the shafts in each retort, the shafts at one end of the retorts being slidable; of yokes slidably mounted on the sides of the retorts having bearings to receive the ends of the slidable shafts, a rod connecting the cross bars of said yokes, bell crank levers pivotally mounted on said furnace, their upright members being connected to said rod and their horizontal members being weighted, whereby to maintain a tension on said conveyors, sprocket wheels on one end of each slidable shaft, an idle sprocket wheel on the yoke on either side of the sprocket wheel of the lower shaft, a sprocket chain, which is passed over the upper sprocket wheel and under the idle sprocket wheels and over the lower sprocket wheel, thereby to move the lower conveyor in an opposite direction from the upper conveyor, an inlet at one end of the upper retort, a discharge at the corresponding end of the lower retort, said retorts communicating at their opposite ends.

5. In an ore roasting furnace of the character described, the combination with horizontal retorts arranged one above the other, and means for heating them; of hoods on the ends of said retorts having horizontal partitions, which close communication between the retorts, a feed hopper on the hood at one end of the upper retort, the partition in the hood at the opposite end having an opening communicating with the lower retort, a discharge at the opposite end of the lower retort, oppositely moving endless conveyors in said retorts and means common to said conveyor for maintaining them under tension.

6. In an ore roasting furnace of the character described, the combination with retorts arranged one above the other, thereby forming an intervening heat flue, a heat flue below the lower retort, a stack on the upper retort midway of its length, by-pass flues connecting the stack and the intervening flue, by-pass flues connecting the intervening flue and the flue beneath the lower retort, and heating means in the latter flue midway of its length, a feed hopper at one end of the upper retort, a discharge conveyor at the corresponding end of the lower retort, a communicating opening between the retorts at the opposite ends thereof, an independent endless conveyor in each retort and means common to both conveyors for maintaining them under tension.

7. In an ore roasting furnace of the character described, the combination with horizontal retorts arranged one above the other; of shafts in the same ends of both retorts which are rotatable only, rotatable shafts in the opposite ends said retorts which are slidably mounted, members slidably mounted on the sides of the retort in which the ends of the latter shafts are mounted, endless rabbling elements mounted on the two shafts in each retort, means whereby motion is imparted to one of the rabbling elements, means operated by the driven rabbling element for moving the other rabbling element in the opposite direction, and means connected with the slidable members whereby tension on the two rabbling elements is maintained.

8. In an ore roasting furnace of the character described, the combination with horizontal retorts arranged one above the other, of a hood on one end of said retorts having a horizontal partition below the level of the floor of the upper retort provided with an outlet, a horizontal plate secured in said hood on a level with the floor of the upper retort and having an inclined end extending to the adjacent edge of said outlet, an arm pivotally secured to the front end of said hood and extending through the same, a shutter secured to said arm and extending to the lower edge of said inclined end and forming therewith a V-shaped hopper which normally closes said outlet, and a weight adjustably mounted on said arm.

In testimony whereof, I affix my signature.

RAY A. BENNETT.